D. I. SELFRIDGE.
DEMOUNTABLE RIM AND SECURING MEANS THEREFOR.
APPLICATION FILED OCT. 2, 1913.
1,127,813.
Patented Feb. 9, 1915.
2 SHEETS—SHEET 1.
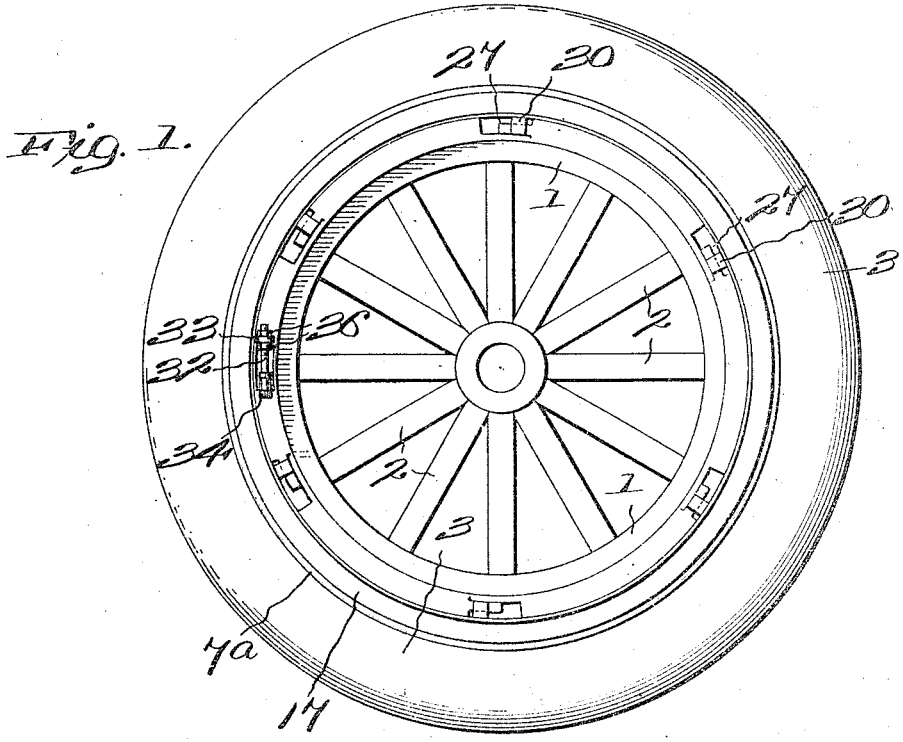
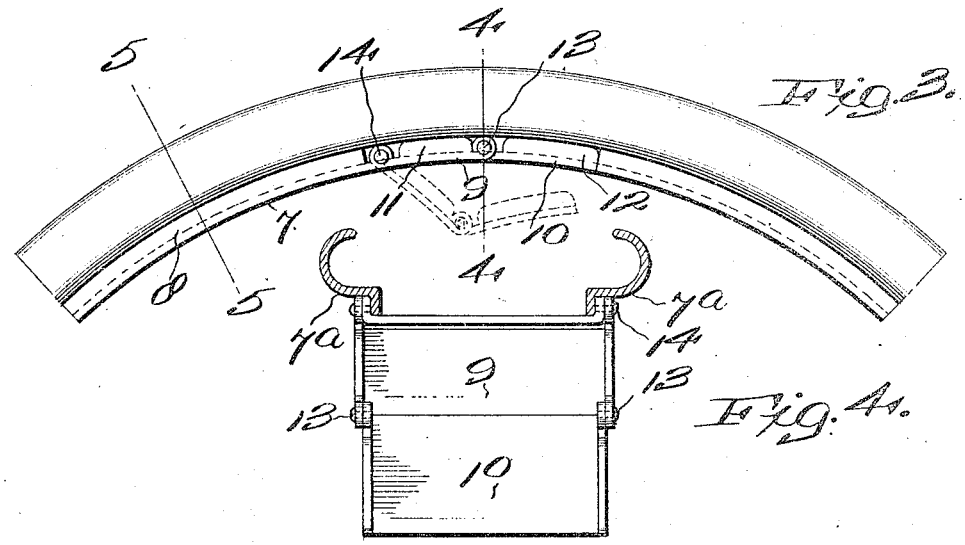

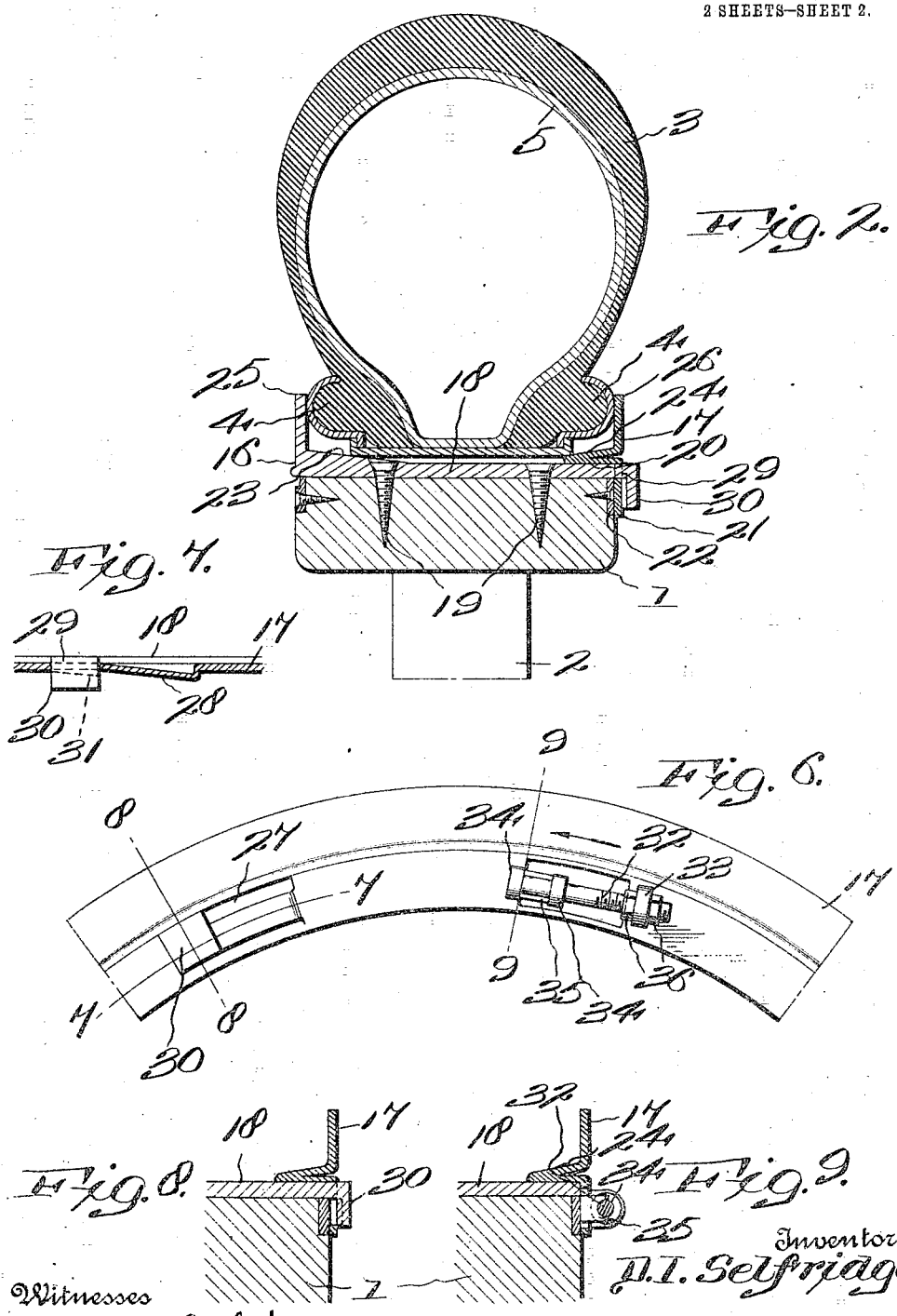

UNITED STATES PATENT OFFICE.

DUNCAN I. SELFRIDGE, OF WASHINGTON, DISTRICT OF COLUMBIA.

DEMOUNTABLE RIM AND SECURING MEANS THEREFOR.

1,127,813.   Specification of Letters Patent.   Patented Feb. 9, 1915.

Application filed October 2, 1913.   Serial No. 793,043.

*To all whom it may concern:*

Be it known that I, DUNCAN I. SELFRIDGE, a citizen of the United States, residing at Washington, in the District of Columbia, have invented certain new and useful Improvements in Demountable Rims and Securing Means Therefor; and I do hereby declare the following to be a full, clear, and exact description of the invention, such as will enable others skilled in the art to which it appertains to make and use the same.

The present invention relates to demountable rims for vehicle wheels and securing means therefor, and has for its purpose to provide a construction wherein the rim may be mounted on or demounted from the tire; and the rim and tire secured to or removed from the wheel in a simple and quickly performed operation.

A further purpose of the invention is to produce a demountable rim for tires of the "clencher" type wherein the direct tire sustaining means securely holds the "clencher" elements in locking engagement; and in which the rim securing means reinforces the rim tire engagement and holds the rim elements in interlocked relation.

With these and other objects in view the invention consists in the novel details of construction and combinations of parts more fully hereinafter disclosed and particularly pointed out in the claims.

Referring to the accompanying drawings forming a part of this specification, in which like numerals designate like parts in all the views: Figure 1 is a side elevation of a wheel illustrating the application of the invention; Fig. 2 is a transverse sectional view thereof taken through the tire and felly; Fig. 3 is a detailed view of the demountable rim showing the locking device therefor; Fig. 4 is a transverse sectional view taken on the line 4—4 of Fig. 3; Fig. 5 is a transverse sectional view taken on the line 5—5 of Fig. 3; Fig. 6 is a detailed view showing one of the securing devices, and the lock-adjusting mechanism; Fig. 7 is a longitudinal sectional view taken on the line 7—7 of Fig. 6; Fig. 8 is a transverse sectional view taken on the line 8—8 of Fig. 6; Fig. 9 is a transverse sectional view taken on the line 9—9 of Fig. 6.

Referring to the construction in further detail, 1 designates the felly of the wheel 2, and 3 the shoe of the tire to be mounted which is of the "clencher" type having the usual beaded edges 4, and 5 is the inner tube.

The demountable rim consists of three members comprising a contractile band or ring 7 and a pair of rigid side rings $7^a$. The ring 7 is divided at one point in its circumference, and has side flanges 8 providing an annular trough or channel-way to receive said rigid side rings. A toggle-joint connects the ends of the ring 7, and consists of two similar pieces 9 and 10 having side flanges 11 and 12, pivotally connected together by means of pins 13, and pivotally connected by the pins 14 to the ring 7 at one end thereof.

The rigid rings $7^a$ are disposed at either side of the contractile ring 7 and are constructed with flanges 15 for engaging with the ring flanges 8 and forming a locking connection therewith when the parts are assembled. (See Fig. 5.) The rings $7^a$ are of semi-circular design in cross section to provide "clencher" elements for engaging with the beaded edges 4 of the tire-shoe, as will be understood.

The toggle-joint connecting the adjacent ends of the ring 7 may be broken after the manner shown in Fig. 3, and said ring contracted for disconnection from the rings $7^a$, and said latter mentioned parts are then free to be removed. In like manner for mounting the tire the contractile-ring 7 may be fitted to engage the flanges 15 of the side rings, and the toggle-joint closed to engage with and force apart the ends of the ring 7 when the parts will be held in interlocked relation.

The rim mounting and securing means comprise sectional rings 16 and 17 of which the former is constructed with a base 18 that is mounted directly on the wheel-felly 1 and secured thereto through the medium of screws 19, or in any suitable manner. The ring section 17 is punched from a plate and constructed with an annular and central ridge portion 20 adapted to be mounted on the base 18, and has a flange portion 21 disposed against a chafe-ring 22 that is counter-sunk in and secured to the side of the wheel-felly 1.

The base and ridge portions 18 and 20 of the ring sections are provided respectively with inclined surfaces 23 and 24 adapted to engage directly with the side edges of the ring 7 of the demountable rim to exert a wedging action against said rim, as will be further explained. The two ring sections 16 and 17 are further provided with radially disposed annular flanges 25 and 26 respectively that provide a trough with said sections to receive the demountable rim, and said flanges engage with the "clencher" elements of the rigid rings 7ª and reinforce the securing engagement of said "clencher" elements and the beaded edges of the tire.

The ring section 17 has its flange 21 provided with a plurality of L-shaped openings 27, and immediately adjacent each of said openings the flange is constructed with a wedge element 28. (See Figs. 6 and 7.) The base portion 18 of the ring section 16 is provided with a plurality of integrally formed members 29 projecting through the openings 27, as clearly illustrated in Figs. 2 and 8. Said members 29 are each formed with a downwardly disposed flange or head 30 having an inclined inner face 31 providing a wedge adapted to engage with the adjacent wedge 28 of the flange 21 and form an interlock therewith.

The several wedge-locking devices carried by the two ring sections are adapted to be simultaneously and uniformly brought into locked and unlocked relation through the medium of a screw-threaded bolt 32 mounted on a boss 33 secured to the ring section 17, and having heads 34 engaging with a stud 35 carried by the base of the ring section 16. A pair of nuts 36 mounted on the bolt 32 engage with the two sides of the boss 33 and provides the means for adjusting the bolt to set the wedges and hold the same in set position.

It is obvious that those skilled in the art may vary the details of construction and arrangement of parts without departing from the spirit of my invention, and therefore I do not wish to be limited to such feature except as may be required by the claims.

I claim:—

1. The combination with a vehicle wheel provided with a rim-receiving channel, of lugs projecting from said wheel, a removable ring forming one side of the rim-receiving channel and provided with slots for receiving said lugs and wedge elements for coöperating with said lugs to lock the ring to the wheel, and means for turning said ring to move the elements into engagement with said lugs, said means comprising a stud projecting from said wheel, a bolt fixedly mounted in said stud, a boss projecting from said ring and receiving the bolt therethrough, and nuts run on said bolt at either side of said boss, substantially as described.

2. The combination with a vehicle wheel provided with a rim-receiving channel, of a plurality of lugs projecting laterally from said wheel, radially disposed heads on said lugs and provided with inclined inner faces, a removable ring forming one side of the rim-receiving channel and provided with a plurality of locking slots for receiving said lugs and wedge elements formed integral with said ring adjacent the locking slots for coöperating with the inclined inner faces of said lugs to lock the ring to the wheel, and means for turning said ring to move the wedge elements to engage the heads on the said lugs, said means comprising a stud projecting from said wheel through one of the slots in said ring, a bolt fixedly mounted in said stud, a boss projecting from said ring for receiving the end of said bolt, and a pair of nuts run upon said bolt at either side of said boss, substantially as described.

In testimony whereof, I affix my signature, in presence of two witnesses.

DUNCAN I. SELFRIDGE.

Witnesses:
H. M. BROWNING,
A. T. CHURCH.